Inventors:
Walter C. Barnes,
Henry W. Keevil,
By Manny Brown + Co.

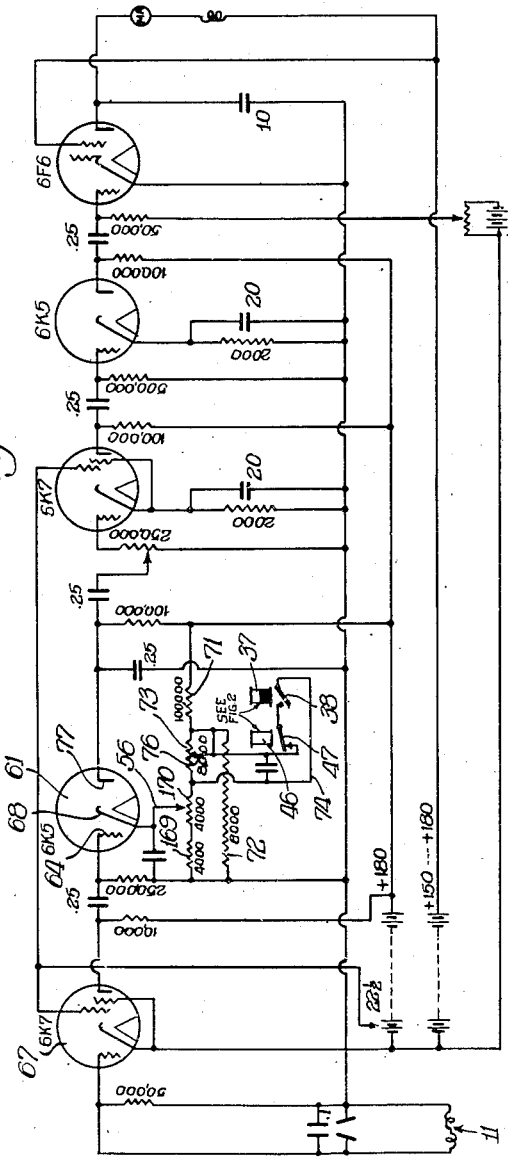
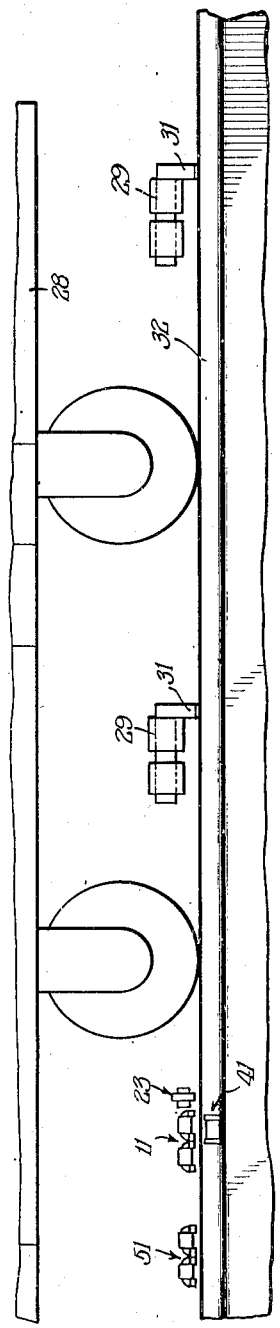
Inventors:
Walter C. Barnes,
Henry W. Keevil,

Inventors:
Walter C. Barnes,
Henry W. Keevil,

Patented June 14, 1949

2,472,784

UNITED STATES PATENT OFFICE 2,472,784

METHOD AND APPARATUS FOR DETECTING FLAWS

Walter C. Barnes, Lake Bluff, and Henry W. Keevil, Evanston, Ill.

Application September 8, 1943, Serial No. 501,537

23 Claims. (Cl. 175—183)

In detecting hidden flaws in rails of railroad tracks, a test car is run along the track with apparatus which detects hidden fissures within the rail head. It is highly desirable to detect even very small fissures, because although they may not seriously affect the strength of the rail while they remain quite small, there is danger that they will grow rapidly and cause a break in the rail. Of course, that can cause a disastrous wreck.

Although the detecting equipment is capable of detecting very small fissures, there is a practical difficulty that when it is adjusted with sufficient sensitivity to detect the very small fissures, it also reacts to numerous non-fissure irregularities, giving indications similar to those it gives for fissures. When this occurs, the detecting crew must either stop the car for a hand check of the portion of the rail where the indication was made to determine by the reliable hand check methods whether or not a fissure is present, or else the crew must take some chance on passing up a flaw. Of course, the crew should take such a chance only when it sees a burn or other surface defect which could have caused the indication, but even when it makes this observation, it cannot be sure without a hand check that there is not also a flaw beneath the surface defect. Furthermore, there is no reliable way of checking the judgment of the crew if a large number of non-fissure indications is made. Because of these difficulties, it is necessary to choose a sensitivity which will not detect too many non-fissure irregularities, but of course it will not detect fissures as small as would be desirable.

One practice heretofore has been to provide a plurality of pens, each operated by a separate detector system, the systems having different degrees of sensitivity or differing in other respects. These different pens help the crew to judge whether or not a given indication is one which warrants taking the time to stop the car and make a hand check. Usually one of the pens will be operated by a relatively sensitive detector system. The other pen will be operated either by a relatively insensitive detector system or by a detector system which is controlled by a pick-up device running along the gauge side of the rail head, where some of the non-fissure magnetic fields are less strong than along the top of the rail head. In all such instances there is a very strong tendency for the crew to rely too heavily on the cleanest record and to attribute any additional indications by the more sensitive pen to some non-fissure defect. Furthermore, considerable experience is required for proper interpretation of the multiplicity of pens, and even experienced men may have difficulties when successive irregularities come too close together.

According to the present invention, the advantages which are theoretically obtainable from the simultaneous use of different detector systems are obtained without the difficulties and disadvantages of multiplying the number of pens by virtue of interlocking circuits. The "mental work" which would be required by a plurality of differential pens is, in effect, done automatically by the apparatus. For example, the main pen may be operated by the detection system of highest sensitivity unless some other detecting system operates an interlock to prevent the high sensitivity operation. In the preferred forms of the invention, a pick-up or combination of pick-ups which is selectively sensitive to burns or other non-fissure irregularities is utilized either to nullify or to reduce the sensitivity of the regular high sensitivity detector system. Preferably also a gauge pick-up is provided to restore the operability or high sensitivity of the regular detector system if an impulse of predetermined strength is obtained from the gauge position. In other words, under normal situations a very small fissure will be detected by the high sensitivity system. If however, a burn or perhaps certain other surface defects are encountered, the burn sensitivity pick-up will operate an amplifier which will nullify the high sensitivity, unless at the same time a gauge pick-up detects a magnetic condition along the gauge position which indicates that a fissure is likely to be beneath the burn. If the high sensitivity system is not completely cut out but is merely reduced in sensitivity, it may detect a fissure beneath the burn even if this fissure is at the outside of the rail where it will not be detected by the gauge pick-up.

With this arrangement it is seen that one or two pens will suffice for a wide variety of detector systems. Hence, the advantages of any number of discriminatory methods may be obtained without the confusion or dangers or costs of multiplicities of pens and with less reliance on human judgment.

Even without a reduction in the number of pens there is considerable advantage in interlocking two detectors to increase the ease or certainty of interpreting the record, as by eliminating from one of the pens some non-fissure indications thereof.

Additional advantages and objects of the invention will be apparent from the following description and from the drawings in which Fig. 1 is a schematic diagram of one form of the invention chosen for illustration;

Fig. 4 is a circuit diagram for an amplifier which may alternatively be used in Fig. 2 and which, except for certain features not applicable, may be used in all of the amplifiers of this invention;

Fig. 5 is a diagrammatic representation of a detector car including one form of this invention.

A preferred form of the invention has been chosen for illustration and description, in compliance with Section 4888 of the Revised Statutes, but persons skilled in the art will readily perceive other means for accomplishing the same results, and the claims are therefore to be construed as broadly as possible, consistent with the prior art.

In the preferred residual magnetic system of testing, the rail is progressively energized by electromagnets 29 as indicated in Fig. 5, to leave characteristic residual magnetic fields adjacent the rail in the vicinity of fissures and an exploring unit such as 11, following outside of the field of these magnets, detects these fields and operates recording means. Some features of the invention may be used with the electro-inductive system of testing in which the exploring device moves along a part of the rail through which a heavy current is being passed.

Figure 1:
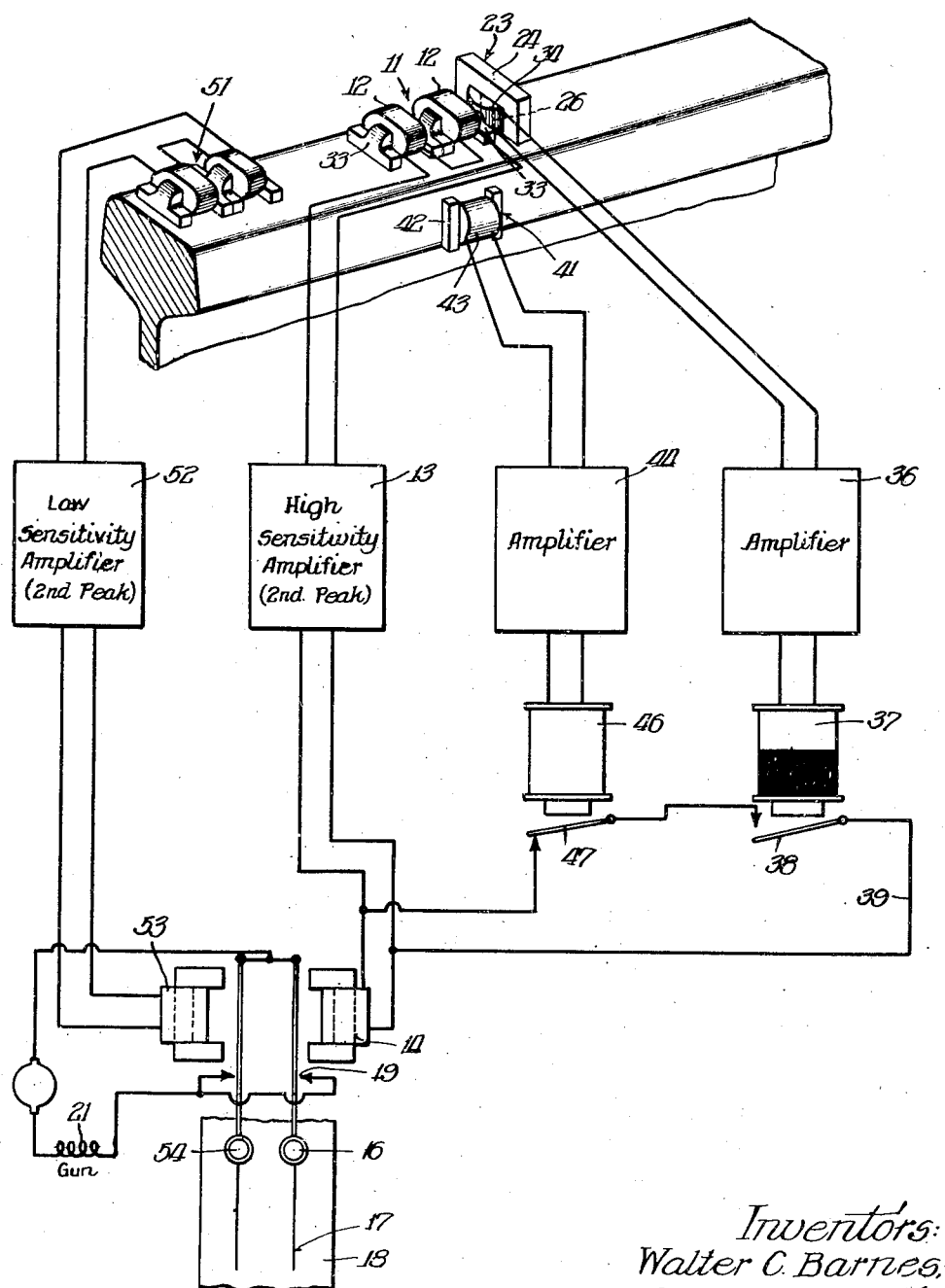

In Fig. 1, the invention has been illustrated in a form which is especially designed to distinguish fissures from wheel burns and to detect fissures beneath wheel burns while at the same time having high sensitivity for detecting very small fissures when no wheel burns are present.

When the wheel of a locomotive spins, the heat generated produces a wheel burn on the rail. Some of the metal of the rail may be displaced and the magnetic characteristics of the metal adjacent to the surface of the rail may be affected by the burn. In the past, wheel burns have been extremely troublesome because of the fact that the detecting apparatus of high sensitivity would be responsive to them. Hence on track with a good many wheel burns where the time consumed to make a hand check at each wheel burn would be prohibitive, it has been necessary to set the sensitivity of the detecting apparatus low enough so as not to pick up wheel burns, or else to disregard an indication if a wheel burn was present and thus take a chance at missing a bad fissure beneath the wheel burn.

In Fig. 1, the main pick-up unit may be regarded as the unit 11 which has been illustrated as embodying two pick-up devices in end to end contact with one another. The coils 12 are connected in series opposition to an amplifier 13 which is preferably a high sensitivity amplifier so that when there are no non-fissure indications to interfere, it will detect very small fissures. Normally, an impulse of predetermined strength will be amplified by the amplifier 13 and energize pen relay 14 to operate pen 16 and make a mark 17 when on a moving tape 18. The operation of the pen relay 14 may also close a contact 19 to close a circuit through a magnet coil 21, to cause a paint gun to shoot a spot of paint on the side of the rail thus marking the point at which a fissure has been discovered.

To the extent thus far described, the pen 16 would also be operated by non-fissure irregularities in the rail, the indications thus being made being called false indications. A large number of false indications is highly undesirable. If they come in close succession, even an experienced crew is likely to make mistakes in interpreting the record or at least be delayed to make sure that no mistake is made. Furthermore, there is no method of checking on the judgment of the crew when it is decided that a given indication is a false indication.

According to the present invention, a large number of these false indications are avoided. An auxiliary pick-up unit 23 is provided as close to pick-up unit 11 as is possible without magnetic interference between the units. The unit 23 preferably includes an E-shaped laminated core 24 arranged transversely of the rail and with its central pole 26 so positioned that this pick-up unit is selectively responsive to burns, or perhaps to some other type of non-fissure irregularity.

In the case of burns, at least with the residual magnetic system of flaw detection illustrated in Fig. 5, the central pole 26 should be disposed above the center of the burns. Of course the burns are not all positioned exactly alike transversely of the rail head, but an approximate average center can be selected.

One possible reason why an E-shaped transverse coil is selective to burns and other non-fissure irregularities can best be explained with reference to Fig. 5.

In Fig. 5, a detector car 28 moves from left to right. It carries one and preferably a plurality of magnetizing electro-magnets 29, each of which has a pole 31 extending close to the rail head 32. The purpose of the magnets 29 is to magnetize the rail with a longitudinal magnetism. In doing so, however, there is a high concentration of generally vertical flux immediately beneath each of the poles 31. Most fissures lying in vertical planes are not greatly affected by this flux while it is vertical. Burns, on the other hand, and some other non-fissure irregularities, are always disposed horizontally along the surface of the rail and hence are highly affected by this vertical flux. Accordingly, the residual magnetic field which remains in the vicinity of a burn is different from that which remains in the vicinity of a fissure, the field in the vicinity of the fissure being of longitudinal nature, and that in the vicinity of a burn being of a vertical nature, the flux tending to extend away in all directions from the magnetized zone.

Referring to Fig. 1, it is seen that longitudinal flux will have very little tendency to pass through transverse core 24 while it will have a very strong tendency to pass through the longitudinal cores 33. Vertical flux on the other hand may enter the center pole of transverse core 23 and return to the rail through the side poles thereof. Hence the pick-up unit 23 is quite responsive to burns but not to most fissures. However some fissures have transverse field characteristics above the rail which cause flux to pass through core 24. But unless one polarity or pole area of the field is close to the center leg of core 24, the flux will tend to pass at least in part and sometimes almost entirely through the core from the pole at one end of the core to the pole at the other end, relatively little of the flux passing through the coil 34.

When a burn or other surface defect sends flux up through pole 26 and hence through the coil 34, an impulse will be impressed on amplifier

30. If the impulse has a predetermined strength, it will actuate relay 37, thus closing armature contact 38 and closing shunting circuit 39 to short circuit or shunt out pen relay 14 so that no impulse from amplifier 13 can actuate the pen.

Of course the pick-up 23 and its amplifier could actuate a separate pen and their doing so would be within the scope of one of the broader aspects of this invention. In that event, both this pen and the main pen 16 would make an indication when a burn is encountered and the screw or anyone checking the tape afterwards would recognize that since a burn had been encountered at this point, the indication of the main pen 16 was likely to be due to the burn only and could be disregarded if there were no special reason to suspect a fissure. With some interlocking arrangement such that the actuation of pickup 23 prevents operation of the main pen 16 by its pick-up 11, there would be an apparent additional advantage that instead of having two marks indicating an irregularity which would ordinarily be disregarded, the record is kept clean, no mark being made. It would follow that whenever a mark is made, something must be done about it. This has important psychological advantages in eliminating human errors but the serious disadvantage of not even calling forth the judgments of the crew to consider the probability of the existence of a fissure under the burn. In order to detect fissures under the burns, one or two cooperative features are desirable.

It has already been the practice, when using a main pick-up unit in the position of until 11 along the top of the rail to use a gauge pick-up unit 41 along the gauge side of the rail in the space which must always be left for the flange of the wheel. This unit 41 may be provided with a longitudinal bore 42 and a coil 43. Most of the nonfissure irregularities are at the tops of the rails and either because of this fact or because of the fact that their fields are mainly vertical, they have relatively little effect on the pick-up unit 41. Accordingly, the pick-up unit 41 and its amplifier 44 will generally avoid responding to burns or the like even though they have a sensitivity sufficient to pick up many fissures. In the past, the gauge pick-up has operated its own pen independently of any other pick-up unit. This was less than perfect for two reasons. It required additional thought processes on the part of the crew and it occasionally responded to "shelly rail" surface characteristics on the gauge side of the rail giving a false indication that would not have been detected by the main pick-up at the top of the rail. According to the present invention, both of these imperfections are overcome through the use of the interlocking system.

The amplifier 44 is connected with a relay 46, the armature contact 47 of which is closed when the relay 46 is not energized. The contact 47, however, is in series with contact 38 so that its being closed has no effect unless the pick-up unit 23 detects a burn or the like in which case the contact 47 merely permits the contact 38 to shunt out the pen relay 14 so that there will be no indication. If, however, the pick-up unit 41 detects a fissure under the burn detected by the pick-up unit 23, it will actuate relay 46 and open contact 47, thus preventing contact 38 from shunting out the pen relay 14. Since we have assumed a fissure large enough to actuate pick-up 41, it would also actuate pick-up 11 and thus actuate pen relay 14 and produce an indication on the tape 18. If, however, the pick-up unit 41 detects some surface irregularities on the gauge side of the rail, this will not affect the main pick-up unit 11 and hence, although the contact 47 would be raised, it would have no effect.

Additional apparatus for detecting fissures under burns may be provided either instead of unit 41 or in addition thereto. It may be noted that the pick-up unit 41 is much more responsive to fissures close to the gauge side of the rail than to fissures remote from the gauge side of the rail so that a moderate-sized fissure on the remote side of the rail might cause no indication by the pen 16 if it happened to lie under a burn. As a further safeguard therefor, a pick-up unit 51 may be used which may be identical with the unit 11 except that it is connected to a low sensitivity amplifier 52. The amplifier in turn may operate a pen relay 53 which actuates a pen 54. The unit 51 and the amplifier shown in Fig. 4 together comprise a system which in itself has a high ability to distinguish between fissures and non-fissure irregularities. By adjusting the sensitivity contact 56 in Fig. 4 for low sensitivity, the system will be non-responsive to most non-fissure irregularities. The term "low sensitivity" is, of course, only relative. In fact, even with this adjustment, the system will be more highly sensitive to fissures than many detecting systems of the past and hence it will be an absolute safeguard against the possibility of any except very small fissures being missed by the interlocked systems controlling pen 16.

Figure 2:
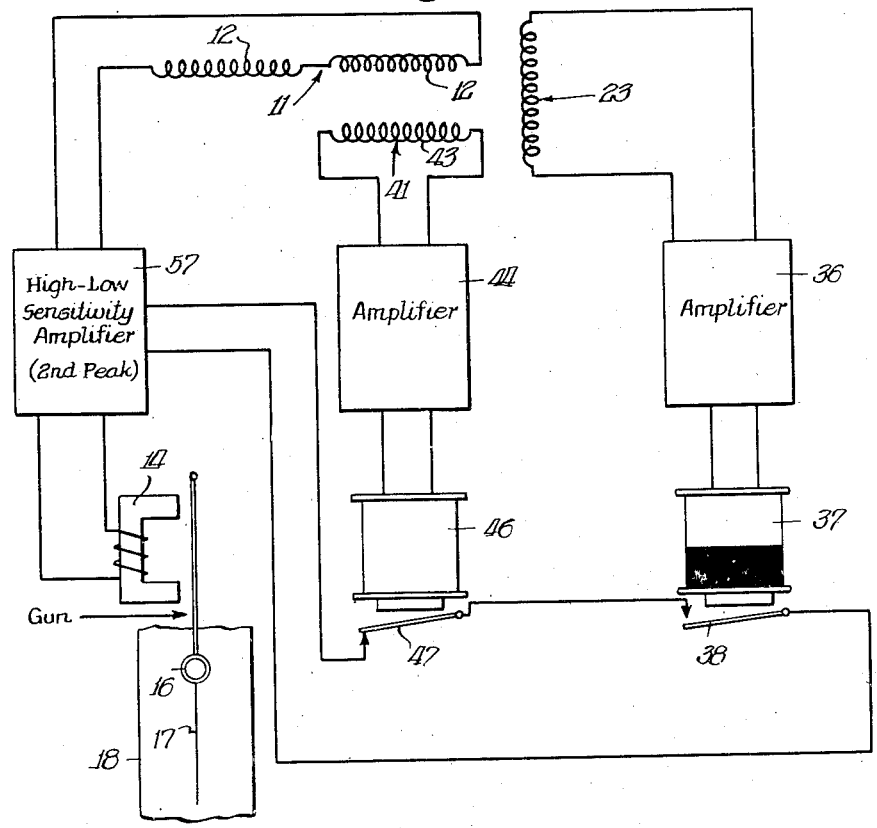
Fig. 2 is a schematic diagram of another form of the invention.

Instead of having two separate systems including the amplifiers 13 and 52 respectively, one of high sensitivity and the other of low sensitivity, a single system can be used, as illustrated in Fig. 2. In this instance, the main pick-up unit 11 has its coils 12 connected to an amplifier 57 which is normally of the high sensitivity of amplifier 13, but which may be reduced to the low sensitivity of amplifier 52. Under ordinary circumstances, the impulse produced by a fissure will actuate pen relay 14 just as in Fig. 1. However, if a burn is picked up by pick-up unit 23, contact 38 will be operated by relay 37 to reduce amplifier 57 to its low sensitivity status. Thus when a burn is detected, the amplifier 57 is reduced to a sensitivity which will not respond to ordinary burns but will respond to a fissure which is of at least moderate size. Again the gauge pick-up unit 41 may be used to nullify the effects of unit 23. Thus if the unit 23 detects a burn and closes contact 38 to reduce the sensitivity of amplifier 57 and the pick-up unit 41 detects a field of predetermined strength at the gauge side of the rail, it will actuate relay 46 to pick up contact 47 and restore the amplifier 57 to its high sensitivity status so that the pen 16 will ordinarily be actuated.

Any suitable method may be chosen for reducing the sensitivity of amplifier 57. The method will naturally depend somewhat on the nature of the amplifier. An amplifier which is at present preferred aside from the automatic sensitivity reduction features is that shown in Fig. 4. It is believed that Fig. 4 will be a sufficient disclosure of this amplifier to those skilled in the art, but it is described in detail in our prior application, Serial No. 482,526, filed April 10, 1943, now abandoned, and the disclosure therein of the amplifier similar to that of Fig. 4 is hereby incorporated by reference as a part of the present disclosure.

Figure 3:
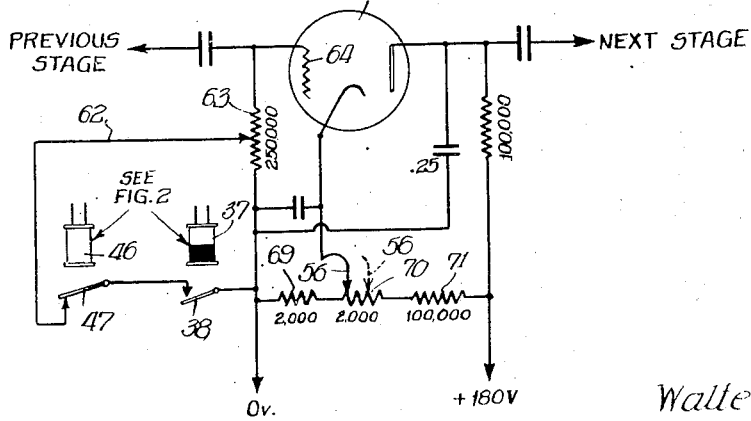
Fig. 3 is a schematic diagram showing one way in which the sensitivity can be varied in Fig. 2.

With this amplifier, one suitable method of reducing the sensitivity is illustrated in Fig. 3 which corresponds to the second stage of amplification in Fig. 4. The tube 61 is the same in both of these figures and the amplifier of Fig. 3 may be the same as Fig. 4 except as shown. The contact 56 will be adjusted for high sensitivity when the contacts 38 and 47 are in the positions shown. When, as described in connection with Fig. 2, the relay 37 is actuated but the relay 46 is not, the contact 38 will close the interlocking or shunt circuit 62 to shunt out part of grid leak resistance 63, the amount shunted out determining the sensitivity of the apparatus in this status.

When the amplifier 57 is reduced to low sensitivity in this manner, it may not be of quite the same highly desirable characteristics as the amplifier 52 in Fig. 1. Accordingly, the sensitivity reducing features shown in Fig. 4 have some advantage, although more experience is necessary in order to finally determine which of these systems is the better.

In Fig. 4, the sensitivity is determined by the bias of grid 64. This is explained quite fully in the application above referred to. Briefly, the grid 64 is biased to a voltage which is on or below the cut-off knee of the tube characteristic curve. When the bias is below the knee, no impulse impressed on the grid 64 by the pick-up unit (as amplified in the first stage by tube 67) will have any effect unless the voltage of the impulse is sufficient to bring the voltage of grid 64 up beyond the cut-off knee. Hence, it is possible to completely cut out all voltages below the predetermined value. As the grid bias is decreased so that it approaches the cut-off knee, the voltage below which impulses are cut out is correspondingly reduced. At some point about the top of the knee, all impulses will be fully passed on, although whether or not the weakest of these will then be sufficiently strong to actuate the recording device will depend in part upon the characteristics of the remainder of the amplifier. For high sensitivity, it is at present desired to operate approximately at the bottom of the cut-off knee so that low voltages will be passed on so inefficiently if at all that the recording device will not operate.

The grid bias is the difference in potential between the grid 64 and the cathode 68. It can be provided by a special battery sometimes known as the "C" battery. In Fig. 4 however, it is provided by a potentiometer across the high voltage battery. The elements of this system are clearly seen in Fig. 3. Here it is seen that resistances 69, 70 and 71 are connected in series across 180 volts. The total value of this resistance is 104,000 ohms and hence a very small current will be flowing through these resistances at all times. Resistances 69 and 71 may be fixed resistances, but resistance 70 is a potentiometer with a sliding contact 56. The current passing through resistance 69 and the first part of resistance 70 produces a voltage drop which voltage constitutes the grid bias. The current being approximately constant, the bias is proportional to the resistance which creates it and hence is adjusted by shifting contact 56. The full line position for contact 56 is the low bias position corresponding to high sensitivity whereas the dotted line position is a high bias position corresponding to low sensitivity.

The amplifier could be changed from low sensitivity to high sensitivity by having taps in each of the positions of sliding contact 56 and shunting out the intervening resistance by a back contact of a relay corresponding to the relay 37. To use this form of the invention would mean, however, that the functioning of the system at high sensitivity would depend upon the absence of any contact trouble in connection with the assumed back contact. This would be dangerous because a minute speck of dust in such a contact would either render the system inoperative or reduce it to low sensitivity without the crew's being aware of this fact and considerable lengths of rail might be tested with a low sensitivity setting which would miss many very small fissures before the existence of the contact trouble was discovered. The arrangement in Fig. 4 avoids this danger. In short, it provides a "fail-safe" system. Any contact failure is on the side of safety.

In Fig. 4, the contacts 38 and 47 vary the current through resistances 169 and 170 instead of varying the resistance through which the constant current flows as in Fig. 3. It will be observed that these resistances are of twice the value of the resistances 69 and 70 although the resistance 71 remains unchange. These resistances are doubled because a shunting resistance 72 is provided which, if resistance 73 is ignored carries half the current that flows through resistance 71. The resistance 73, however, considerably further reduces the flow of current through resistances 169 and 170. With the current thus reduced, the contact 56 is adjusted to give the desired high sensitivity adjustment. Any increase of the current through resistances 169 and 170 will now increase the voltage of the bias and hence decrease the sensitivity. This increase of current and decrease of sensitivity is accomplished by contact 38 when relay 37 is actuated as in Fig. 2. The contact 38 closes the shunting circuit 74 which decreases the resistance of resistance 73 by an amount depending on the setting of sliding potentiometer contact 76. Thus with the contact 38 held closed, contact 76 may be adjusted to give the desired low sensitivity adjustment.

As in Fig. 2, actuation of relay 46 in response to gauge pick-up 41 will open the shunting circuit 74 to restore the high sensitivity of the amplifier.

The use of resistance 72 permits varying the grid bias without greately varying the current through resistance 71, although the closing of shunt circuit 74 has relatively little effect on the total resistance because the shunted portion of resistance 73 is very small as compared to the one hundred thousand ohms of resistance 71. This shunting nevertheless has a very great effect on the division of current between the two branches, namely the branch comprising resistance 72 and the branch comprising resistances 169, 170 and 73.

The contacts 38 and 47 could be used in a similar manner in connection with a separate "C" battery and potentiometer combination for biasing the grid 64 without in any way affecting the voltage of cathode 68 with respect to its plate 77. In some ways, this would be preferable as there would be less likelihood that opening or closing the contact 38 would have any tendency to create an impulse.

It should be observed that the relay 37 is a slow release relay. The reason for this is that the pick-up 23 will pass over the burn and even pass beyond the burn before the pick-up unit 11 passes beyond the point where the burn can cause an actuation thereof. Accordingly, if the amplifier 37 released immediately, its contact 38 would open and restore the high sensitivity characteristic of the amplifier 36 or the amplifier 57. The slow release characteristic of relay 37 is to provide the necessary bridging over. The release should be as quick as possible consistent with the purpose of preventing the burn which is picked up by unit 23 from actuating the pick-up unit 11. The delay characteristic is preferably adjustable in any well-known manner as by combination of adjusting the return spring and adjusting the position to which the armature may be actuated by the relay 37.

The relay 46 need not have special slow release characteristics because the pick-up unit 41 may and should be so positioned that actuation thereof will approximately coincide with actuation of pick-up unit 11 when the two are actuated by the same irregularitiy. In this connection, it should be noted that the unit 11 is preferably connected with a polarity such that the first impulse received from it impresses a positive impulse on the grid of tube 67 which in turn impresses a negative impulse on the grid 64. Since the grid 64 is already biased with a negative voltage at or below the cut-off value, no impulse is transmitted as a result of a further negative voltage being impressed thereon. However, when the two central poles of unit 11 pass over a fissure, a very strong negative impulse is impressed on the grid of tube 67 and a correspondingly strong positive impulse is impressed on the grid 64, thus overcoming the negative bias thereof and sending through an impulse which actuates the recording apparatus. When the third pole of unit 11 passes over the fissure, its impulse is again negative and hence is cut out as was the first impulse.

A circuit similar to Fig. 4 used in amplifier 44 will cut out either the first or second impulse thereof, i. e. either the first or second half of the complete impulse wave, depending on the connections of coil 43 to amplifier 44. At the present time, it is preferred that these connections be such that the impulse peak occuring when the second pole passes adjacent the fissure is a negative impulse so that the first impulse will be cut out by the amplifying system. Thus the amplifier will be selectively responsive to only a portion of the area explored by the coil, viz: the portion explored by only one of the poles of the coil. With this polarity of connection, the second pole of core 42 should be in alinement with the middle poles of unit 11.

The proper polarity for the connection of coil 34 to amplifier 36 will be that which gives the greatest power of distinguishing between fissure and non-fissure irregularities, and if there is no difference between the two polarities in this respect, either may be used.

Looking at the matter from a different angle, if either polarity will give satisfactory distinction between fissures and non-fissures, the polarity should be used which will permit the shortest time delay in relay 37.

Gag elimination

Figure 6:
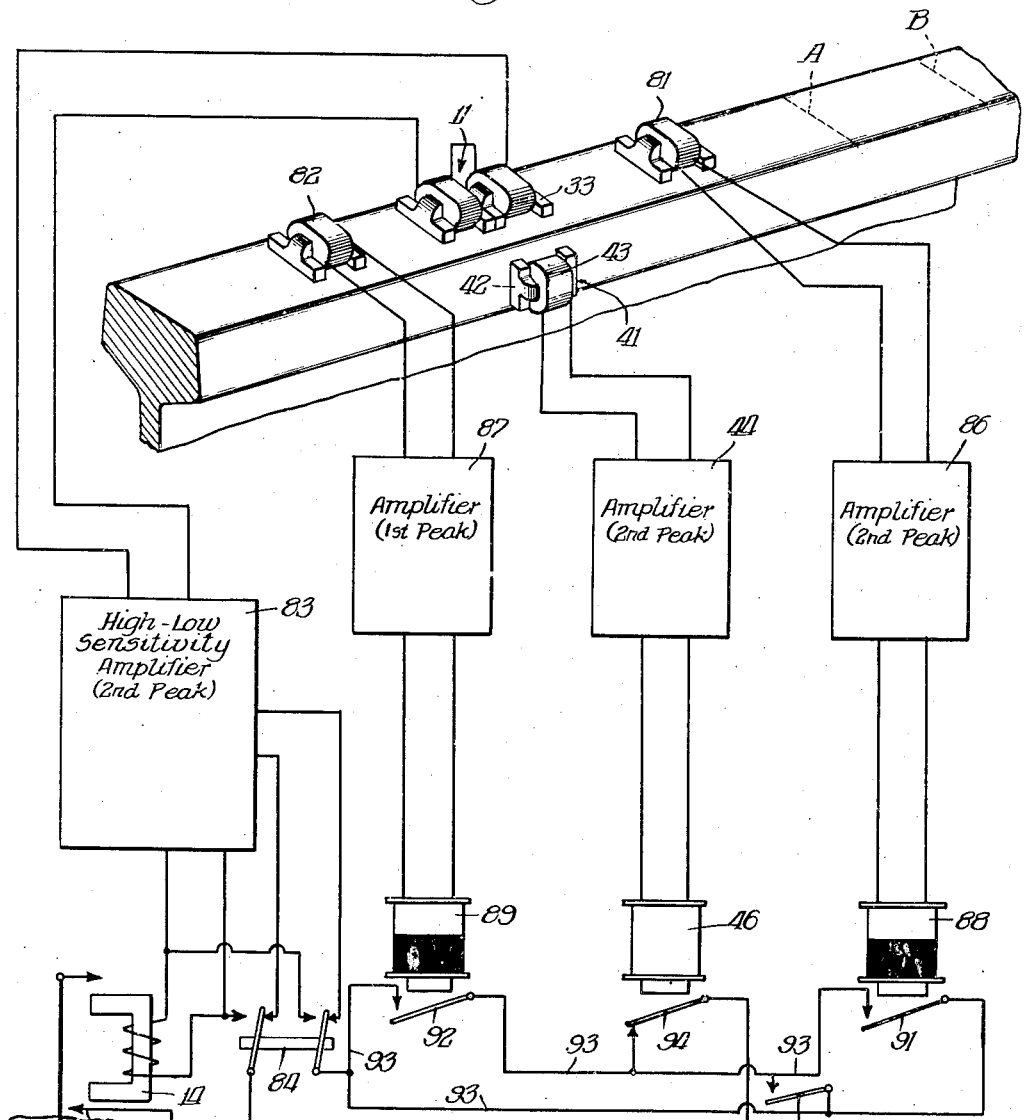
Figs. 6 and 7 are diagrammatic representations of still other forms of the invention.

In Fig. 6 has been shown an apparatus which is especially suitable for avoiding false indications due to "gags." "Gags" or "gag marks" result from straightening the rail at the steel mill. In straightening the rail, the top surface thereof may be stretched slightly beyond its elastic limit. Apparently this slightly changes the magnetic characteristics of the rail in such a way that it simulates two flaws A and B spaced approximately two and one-half inches apart. Apparently either or both of the irregularities A and B may produce an impulse in the main pick-up unit 11 and cause an actuation of the pen 16 falsely indicating a fissure when there is none.

These gags are one of the most troublesome of the non-fissure irregularities when they are encountered in any substantial numbers, partly because they are not as easily recognized especially by the less experienced tester. To some extent, they may be detected and the false indications eliminated by the system shown in Figs. 1 and 2. If they are not sufficiently eliminated by that system, the apparatus shown in Fig. 6 may be used.

Fig. 6 operates on the principle that if, at the time main pick-up unit 11 is at either position A or position B, either of the auxiliary pick-up units 81 or 82 is adjacent position B, and interlock arrangement will prevent actuation of the pen 16.

The pick-up unit 11, pen relay 14, pen 16 and contact 19 may all be the same as in Fig. 1. Amplifier 83 may be either the same as amplifier 13 (perhaps with a slightly different sensitivity adjustment) or the same as amplifier 57 of Fig. 2. It has been indicated as having the variable sensitivity of amplifier 57. However, a hand switch 84 is preferably provided which if shifted to the left will leave the amplifier 83 functioning with fixed sensitivity and cause a shunting out of the relay 14 when the interlocking circuits function to this end. Of course in both instances, it may be said that the interlocking circuit reduces the sensitivity of the system. If it shunts out the relay 14, it reduces the sensitivity to zero.

The pick-up units 81 and 82 may take any form responsive to the gag fields A and B. They have been illustrated as if each were similar to one-half of the unit 11. The units 81 and 82 are connected respectively to amplifiers 86 and 87 which in turn are connected to relays 88 and 89. Relay 88 operates armature contact 91 and the relay 89 operates armature contact 92. These contacts are connected, in parallel, to the shunting circuit 93 through the back side of armature contact 94 of relay 46 which, however, may be dispensed with. It will be apparent from tracing circuit 93 that if either contact 91 or contact 92 closes, it will complete the shunting circuit, thus reducing the sensitivity of amplifier 83 in any of the manners discussed in connection with Figs. 1 to 4. Under this condition, the pick-up unit 11 will not cause actuation of the pen 16 unless there is a relatively strong impulse such as might result from a fissure of at least moderate size. In this discussion the possibility that contact 94 might open should be ignored unless specifically referred to.

Each of the amplifiers is preferably of a nature to react only to one polarity of impulse. This tends to confine the responsiveness of each pick-up unit to conditions arising when a field is in vicinity of one pole, or of the two central poles in unit 11. Such poles may be called the exploring areas of the units.

Now as the units 81, 11 and 82 move along the rail in pre-determined spaced relationship, the following occurs:

1. Unit 81 crosses position A causing actuation of amplifier 86. This closes contact 91 but this merely changes the sensitivity of the main pick-up system 11, 83, 14 and hence has no effect unless, by coincidence, some other irregularity happens to be adjacent the exploring area of main unit 11 during the short time contact 91 is closed. However, if such other irregularity happened to be a fissure which would not actuate unit 41, this fissure might be missed if the hand switch 84 were in its left position. Accordingly, the right position is preferred so that the fissure will not be missed unless it is very small.

2. The exploring area of unit 81, which for conditions at B may be the second pole of unit 81, reaches position B. Again, contact 91 is closed as a result of the magnetic field at position B. The contact is held closed for an interval of time which depends upon how much variation there is in the spacing of positions A and B. If, as in the gags encountered in most rail, A and B are nearly always between two and three inches apart, the contact 91 is held closed for a period of time corresponding to the time it takes the apparatus to travel approximately one inch. During this interval, the unit 11 will cross position A. Although it will transmit an impulse to amplifier 83, this impulse will be unable to actuate pen relay 11 because the high sensitivity characteristic of amplifier 83 will be nullified by the shunt circuit 93 closed through contact 91. Preferably the amplifier is kept operative with low sensitivity so that a fissure of moderate size or larger will be detected even at this point.

3. After unit 11 passes beyond the zone where it may respond to the field indicated by A, contacts 91 will open restoring the high sensitivity operability of amplifier 83 for high sensitivity testing of the rail through at least part of the space between positions A and B.

4. Before the mid poles of unit 11 reach the position B, the first pole of unit 82 will reach the position A. Pick-up unit 82 is connected to amplifier 87 with such polarity that this amplifier is responsive to the first pole or in other words, the first half of the impulse wave induced in pick-up unit 82 by the magnetic field indicated by A. This impulse actuates relay 89 so as to close contact 92, thus repeating the effect of closing contact 91 so that the high sensitivity operability of amplifier 83 is again nullified to prevent the field at position B from causing actuation of pen 16.

5. While contact 92 is held closed by the slow release characteristics of relay 89, the mid poles of unit 11 pass over the position B but actuation of the pen 16 in response to a field characteristic of gags is prevented by contact 92 and shunting circuit 93.

6. As the pick-up unit 11 passes beyond the position where it may be actuated by the gag field indicated by field B, contact 92 is released by relay 89 thus restoring the high sensitivity operability of amplifier 83 for high sensitivity testing of the rail until another gag is encountered. Of course the system of Fig. 1 or 2 could be combined with the present system so as to reduce the sensitivity of amplifier 83 in the event that any non-fissure irregularity is encountered which, though not a gag, would actuate the pick-up unit 23. In this event, the contact 38 would be connected in parallel with contacts 91 and 92. This has been indicated in Fig. 6 by the inclusion of contact 38 although the means for actuating this contact has been omitted for the sake of simplicity.

In order to nullify the high sensitivity operation of amplifier 83 for as brief a time as possible, considerable care should be exercised in spacing the pick-up units 81 and 82 with respect to pick-up unit 11. The pick-up unit 11 is so connected with the amplifier 83 as previously described in connection with Figs. 1 to 4 that only the portion of the impulse occurring when the center poles pass over a fissure or the like is effective to actuate pen 16. Accordingly, it is only when the center poles may pass over fields indicated by A and B that one of the contacts 91 or 92 needs to be closed. The amplifier 86 is preferably selective as to polarity and the connections with pick-up unit 81 are preferably such that amplifier 86 is responsive to only the second half of the impulse wave. With such connections, the second pole of pick-up 81 must reach the field B by the time that the central poles of unit 11 reach field A. This means that the spacing of the second pole of pick-up unit 81 from the central poles of unit 11 must be equal to the maximum spacing of fields A and B which it is desired to take care of. Three inches is at present preferred and is believed to be sufficient for nearly all gags. As previously mentioned, a time delay corresponding to one inch of travel is at present preferred for the release of contact 91 in case the fields A and B may be as close together as two inches.

The pick-up unit 82 and amplifier 87 may be similar to pick-up unit 81 and amplifier 86 except for having the polarity of the connections such that amplifier 87 will respond to the first half of the impulse of pick-up unit 82 which corresponds approximately to the passing of the first pole of pick-up unit 82 over the field. This first pole must reach the position A before the central poles of unit 11 reaches field B. Since the fields may be only two inches apart, the first pole of unit 82 should be not more than two inches from the central poles of unit 11. Again the time delay equivalent of one inch of travel will take care of the other extreme condition, when the spacing of A and B is three inches.

Of course where fields are encountered which are of different nature than those assumed, or react differently on the pick-ups, the spacing and the time delays would be correspondingly altered. If pick-up unit 11 is responsive at only one of gag positions A and B, one of the pick-ups 81 and 82 may be omitted.

The relay 46 will be operated by the pick-up unit 41 and amplifier 44 as described in connection with Figs. 1 to 4 so as to restore the high sensitivity operability of amplifier 83 in the event that any magnetic field of predetermined characteristics is encountered along the gauge side of the rail head.

Figure 7:
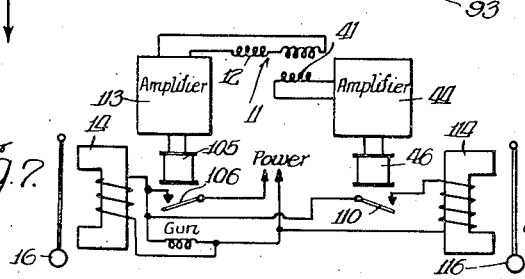

Fig. 7 shows schematically a system which can use certain aspects of this invention with very little change from existing systems. According to this system, a gauge pick-up 41 causes an operation of the gauge pen 116 only if the main pick-up 11 has also actuated. The purpose of this is to eliminate some non-fissure indications of the gauge pen 116 so that the operator may know that whenever the gauge pen 116 operates, a hand check is in order. Of course this form of the invention does not have the advantage of eliminating the gauge pen as in the preceding figures and likewise it does not eliminate any non-fissure indications of the main pen 16. Nevertheless the elimination of non-fissure indications from the gauge pen 116 is quite advantageous especially in simplifying the mental processes which the operator must perform, in avoiding doubts with respect to nearly simultaneous operation, and in permitting more sensitive operation of the gauge pick-up.

In this Fig. 7, the main pick-up 11 may be that illustrated in the other figures or any other form of pickup. The amplifier 113 may be the same as amplifier 13, although it will probably be adjusted for somewhat less sensitivity so as not to produce too many non-fissure indications, there being no means in this figure for eliminating such indications. The amplifier 113 could operate the pen relay 14 directly but has been illustrated as operating an intermediate relay 105 which in turn operates pen relay 14 through its armature 106. In addition to connecting the coil of relay 14 to the source of power, the armature 106 connects armature 110 of relay 46 with the source of power so that relay 46 can actuate gauge pen relay 114 to operate the gauge pen 116.

If gauge pick-up 41 detects a shelly rail and causes actuation of relay 46, the armature 110 ordinarily will not be able to operate gauge pen relay 114 because the circuit will be broken at armature 106. In this way, non-fissure indications at pen 116 are avoided. Extensive experimental use of this system in recent months has indicated that this system is very desirable and that its elimination of non-fissure indications at pen 116 is not accompanied by the loss of any fissure indications. The amplifier 113 is sufficiently sensitive to detect the fissures which have operated the gauge pen relays 114 in normal operation heretofore. The gauge pen has been used to detect fissures beneath visible surface defects which the operator might assume had operated the main pick-up.

Pick-up 41 has been shown as using a single coil. Of course in some instances, particularly in connection with an electro-inductive system, opposed coils would be desired. In general, it might be said that in each instance of the use of a single coil in this invention, opposed coils could be used disposed to balance each other with respect to current changes in the rail. Of course such balancing is important in connection with the electro-inductive system. In this connection, it might be noted that in Fig. 6, the coils 81 and 82 could be connected to a single amplifier and relay so that one of the amplifiers 86 and 87 and one of the relays 88 and 89 could be omitted. In that event, the coils 81 and 82 would preferably be connected in series opposition.

Although the interlocking arrangements shown have involved relays, similar results could also be obtained by entirely electronic interlocking arrangements, in which case, any amplifier, instead of operating a relay, could for example, impose a voltage on an extra grid in one of the tubes of the main amplifier.

The interlocking concept of this invention may be used whenever a plurality of pens could be used for indicating different situations to the crew and in all such instances, the interlocking will do the "thinking" which would otherwise have to be done by the crew. Thus it becomes possible with almost any combination of systems to avoid so nearly all false indications that a relatively clean record will be established and substantially every mark on the record will be indicative of an almost certain fissure and hence every mark will be cause for a hand check so that the errors of human judgment will be substantially eliminated. This is, of course, especially true when the various non-fissure selective systems herein illustrated are used.

Although the concept of interlocking between differential pick-up units, each adapted to detect minute irregularities of the rail, is new, applicants do not claim to be the first to reduce the sensitivity of a flaw detection system automatically as a result of approaching external influences such as joint bars.

We claim:

1. Progressive detecting apparatus for detecting flaws in a body which has been magnetized to produce characteristic magnetic fields adjacent to irregularities in the body comprising a plurality of closely associated pick-ups, some of which are more responsive to flaws than others, amplifier means associated therewith and separately connected to said pick-ups and recording means adapted to be actuated by the amplifier means in response to an impulse from one of the pick-ups, the responsiveness of said recording means to said impulse being dependent upon the existence or non-existence of an impulse from another of said pick-ups.

2. Apparatus for movement along a rail for progressively detecting flaws in the rail, including a main pick-up responsive to magnetic fields in an exploring area adjacent to the rail, a preceding pick-up responsive to the magnetic fields in an exploring area spaced ahead of the exploring area of the main pick-up a distance equal to approximately a maximum length characteristic of gag marks in the rail and a following pick-up responsive to magnetic fields in an exploring area positioned behind the exploring area of the main pick-up a distance approximately a minimum characteristic length of gag marks, recording means responsive to the main pick-up and means reducing the effective sensitivity of the main pick-up when either of the other pick-ups responds to a magnetic field in its exploring area and for a predetermined time thereafter, corresponding to the time required for the movement of the apparatus a distance equal to the difference between said maximum and minimum lengths.

3. Apparatus for detecting flaws in a metallic body which has been energized to produce characteristic magnetic conditions adjacent to the body in the vicinity of flaws, including a detector movable along the body for locating said characteristic conditions, a recorder operated by said detector, said detector comprising at least two units adapted to respond concurrently to the same longitudinal portion of the body, each including a flux-responsive pick-up, one being responsive to certain flux conditions adjacent the body the other being responsive to certain other flux conditions adjacent the body, and means for so interlocking said two units that their combined responsiveness to particular flux conditions caused by irregularities in the body, determine whether or not the recorder is actuated.

4. Progressive flaw detection apparatus including pickups for responding to magnetic fields in the vicinity of a body which are characteristic of irregularities therein, said pickups being movable along different surfaces of the body, one of which is less likely to have certain types of surface irregularities thereon than the other, amplifying means associated with the pickups selectively responsive to a particular portion of the exploring area thereof, said pickups being disposed and adapted to respond concurrently to the same longitudinal portion of the body, and recording means operated by said amplifying means, and so constructed and arranged that the combined responsiveness of said pick-up units to particular flux conditions caused by irregularities in the body determine whether or not the recording means is actuated.

5. Progressive flaw detection apparatus for detecting fissures in a body which has been energized to produce characteristic magnetic fields in the vicinity of a body which are characteristic of fissures and other irregularities therein, a first pick-up movable along the body to detect said fields, an amplifier operatively connected to the first pick-up for actuation thereby and with it forming a first detector system, a second pick-up movable adjacent to the first pick-up but along a different surface of the body less likely to have certain types of surface defects thereon, a second amplifier connected to said second pickup for actuation thereby and forming therewith a second detector system, said two systems being concurrently responsive to the same longitudinal portion of the rail, and recording means responsive to substantially concurrent actuation of both of said amplifiers, but nonresponsive to a certain one of them alone.

6. Progressive means for movement along a rail for detecting wheel burns on the rail, which burns have been energized by concentrated vertical flux to produce residual magnetic fields adjacent thereto characteristic of the burns including a pick-up movable along the rail to be responsive to residual fields adjacent the rail characteristic of irregularities thereof, said pick-up comprising an E-shaped magnetic core, means to hold said pick-up with said core positioned approximately perpendicular to the length of the rail and a coil on said core responsive to changes of flux through the middle leg of the core said middle leg being positioned to pass directly over the wheel burns on the rail.

7. Progressive means for movement along a rail for detecting wheel burns on the rail, which wheel burns have been energized by concentrated vertical flux to produce magnetic fields adjacent thereto characteristic of the burns including a pick-up movable along the rail to be responsive to residual fields adjacent the rail characteristic of irregularities thereof, said pick-up comprising a coil, a core having at least two pole portions, connected by a core portion extending through said coil, and means to support said pick-up with said two pole portions disposed on a line approximately at right angles to the length of the rail with one of said pole portions positioned substantially along the center line of the rail.

8. Progressive means for movement along a rail for detecting surface irregularities on a rail, which surface irregularities have been energized by concentrated vertical flux to produce magnetic fields adjacent thereto characteristic of irregularities including a pick-up movable along the rail to be responsive to residual fields adjacent the rail characteristic of irregularities thereof, said pick-up comprising a coil, a core having two pole portions connected by a core portion extending through said coil, and means to support said pick-up with said two pole portions disposed on a line approximately at right angle to the length of the rail with one of said pole portions positioned substantially along the center line of the rails.

9. Progressive flaw detection apparatus for movement longitudinally of a body which has been energized to produce magnetic fields in the vicinity of the body some of which are characteristic of fissures and some of which are characteristic of other irregularities therein, a main pick-up movable along the body to detect fields therein including those characteristic of fissures, an amplifier operatively connected to the main pick-up and with it forming a main detector system, recording means operated by said main detector system, a second pick-up which is selectively responsive to the fields of non-fissure irregularities, an amplifier connected to said second pick-up and means controlled by said amplifier in response to the detection of a non-fissure impulse for reducing the sensitivity characteristic of the main detector system, said controlled means responding to the same longitudinal portion of said body as said main detector system and at the same time.

10. Progressive flaw detection apparatus for movement longitudinally of a body which has been energized to produce magnetic fields in the vicinity of the body some of which are characteristic of fissures and some of which are characteristic of other irregularities therein, a main pick-up movable along a surface of the body to detect fields including those characteristic of fissures, said surface being likely to have surface defects, and an amplifier operatively connected to the main pick-up and with it forming a main detector system, recording means operated by said main detector system, a second pick-up which is selectively responsive to the fields of non-fissure irregularities, a second amplifier connected to said second pick-up and means controlled by said second amplifier in response to the detection of a non-fissure impulse for reducing the sensitivity characteristic of the main detector system, a third pick-up movable along a surface of the body less likely to have surface defects thereon, a third amplifier connected thereto and means controlled by the third amplifier when its associated pick-up detects a magnetic field of pre-determined strength for restoring sensitivity to the main detector system, said first amplifier and said two means controlled by said second and third amplifiers, respectively, being responsive simultaneously to the same longitudinal portion of said body.

11. Apparatus for detecting flaws in a metallic body which has been energized to produce characteristic magnetic conditions adjacent to the body in the vicinity of flaws, including a detector movable along the body for locating said characteristic conditions, a recorder operated by said detector, said detector comprising at least two units responsive concurrently to the same longitudinal portion of the body each including a flux-responsive pick-up, one of said units being responsive to the magnetic fields caused by fissures and the magnetic fields caused by non-fissure irregularities in the body and another of said units being selectively responsive to the magnetic fields caused by non-fissure irregularities in the body, and means for so interlocking said two units that their combined responsiveness to particular flux conditions caused by irregularities in the body determines whether or not the recorder is actuated.

12. Apparatus for detecting flaws in a metallic body which has been energized to produce characteristic magnetic conditions, adjacent to the body in the vicinity of flaws, including a pick-up responsive to said characteristic conditions and movable along the body, an amplifier responsive to the pickup and including a tube having a grid leak resistance and a control grid biased through said resistance, translating means operated by the amplifier, and means for reducing the sensitivity of the amplifier including a relay operable in response to magnetic conditions adjacent said body to shunt out part of said grid leak resistance.

13. Apparatus for detecting flaws in a metallic body comprising an amplifier responsive to a pick-up, adapted to operate translating means, and including a tube having a grid leak resistance and a control grid biased through said resistance, and means for reducing the sensitivity of the amplifier including a relay operable in response to magnetic conditions adjacent to said body to shunt out part of said grid leak resistance.

14. Apparatus for detecting flaws in a metallic body which has been energized to produce characteristic magnetic conditions adjacent to the body in the vicinity of flaws, a pick-up responsive to said characteristic conditions and movable along the body, an amplifier responsive to the pick-up and including a tube having a grid leak resistance and a control grid biased through said resistance, a voltage dividing circuit having a biasing resistance branch and an auxiliary resistance branch in parallel and both connected in series with a resistance of substantially higher value which is chiefly determinative of plate voltage, translating means operated by the amplifier, and means for reducing the sensitivity of the amplifier including a relay operable in response to magnetic conditions adjacent to said body to change the proportion of current flowing between the biasing branch and the auxiliary branch of the voltage dividing circuit.

15. Apparatus for detecting flaws in a metallic body comprising an amplifier responsive to a pick-up, adapted to operate translating means, and including a tube having a grid leak resistance and a control grid biased through said resistance, a voltage dividing circuit having a biasing resistance branch and an auxiliary resistance branch in parallel and both connected in series with a resistance of substantially higher value which is chiefly determinative of plate voltage, and means for reducing the sensitivity of the amplifier including a relay operable in response to magnetic conditions adjacent said body to change the proportion of current flowing between the biasing branch and the auxiliary branch of the voltage dividing circuit.

16. Apparatus for detecting flaws in a metallic body which has been energized to produce characteristic magnetic conditions adjacent to the body in the vicinity of flaws including a pick-up responsive to said characteristic conditions and movable along the body, an amplifier responsive to the pick-up and including a tube having a grid leak resistance and a control grid biased through said resistance, translating means operated by the amplifier, and means for reducing the sensitivity of the amplifier including a relay operable in response to magnetic conditions adjacent to the body to increase the grid bias of said tube.

17. Apparatus for detecting flaws in a metallic body comprising an amplifier responsive to a pick-up, adapted to operate translating means, and including a tube having a grid leak resistance and a control grid biased through said resistance, and means for reducing the sensitivity of the amplifier including a relay operable in response to magnetic conditions adjacent said body to increase the grid bias of said tube.

18. Progressive flaw detecting apparatus for detecting flaws in a body which has been energized to produce characteristic magnetic fields adjacent to irregularities in the body, comprising a main pickup responsive to magnetic fields caused by two conditions of said body, an auxiliary pickup concurrently responsive primarily to magnetic fields in the same longitudinal portion of the body caused by one of said conditions, an auxiliary pick-up concurrently responsive primarily to magnetic fields in the same longitudinal portion of the body caused by the other of said two conditions, a main amplifying means associated with said main pickup, a recording means associated with said main amplifying means and comprising with said amplifying means and said pickup a main detecting combination, contact means effective upon actuation to decrease the sensitivity of said combination, a second amplifying means to actuate said contact means in response to one of said auxiliary pickups, contact means effective when actuated to restore sensitivety to said combination if the sensitivity has been decreased by the first-named contact means, and a third amplifying means to actuate said last-mentioned contact means in response to the other of said auxiliary pickups, the open position of each of said contact means corresponding to high sensitivity in said combination whereby any contact failure will be on the side of higher sensitivity of the main detecting combination in detecting flaws.

19. Progressive flaw detecting apparatus for detecting flaws in a body which has been energized to produce characteristic magnetic fields adjacent to irregularities in the body, comprising a main pickup responsive to magnetic fields caused by two conditions of said body, an auxiliary pickup concurrently responsive primarily to magnetic fields in the same longitudinal portion of the body caused by one of said conditions, an auxiliary pickup concurrently responsive primarily to magnetic fields in the same longitudinal portion of the body caused by the other of said two conditions, a main amplifying means associated with said main pickup, a recording means associated with said main amplifying means and comprising with said amplifying means and said pickup a main detecting combination, contact means effective upon actuation to decrease the sensitivity of said combination, a second amplifying means to actuate said contact means in response to one of said auxiliary pickups, contact means effective when actuated to restore sensitivity to said combination if the sensitivity has been decreased by the first-named contact means, and a third amplifying means to actuate said last-mentioned contact means in response to the other of said auxiliary pickups.

20. Progressive detecting apparatus for detecting flaws in a body which has been magnetized to produce characteristic magnetic fields adjacent to irregularities in the body, comprising a pickup located above the body, a second pickup located along the side of the body laterally of the first pickup, amplifier and recording means associated with said pickups, and means for preventing the side pickup from operating the recording means unless the top pickup concurrently produces an impulse of predetermined magnitude.

21. Rail flaw detecting apparatus including a first pick-up, a first amplifier the input of which is connected to said pick-up, recording apparatus adapted to be operated by signals of predetermined strength produced in said pick-up and transmitted to said recording apparatus through said amplifier, a second pick-up, a second amplifier the input of which is connected to said second pick-up, and interlock means acuated by said second amplifier in response to signals of predetermined strength produced in said second pick-up for attenuating the signals transmitted through the first amplifier to said recording apparatus.

22. Progressive flaw detection apparatus for movement longitudinally of a body which has been energized to produce magnetic fields adjacent irregularities in the body including two detector units each comprising a pick-up and an amplifier associated therewith, recording means connected to one of said units and adapted to respond to a signal of predetermined strength from said one unit, control means connected to the other of said units and operable in response to a signal of predetermined strength from said other unit, and interlocking means associated with the control means constructed and arranged to prevent the actuation of said recording means by a signal from said first unit.

23. Progressive flaw detection apparatus for detecting flaws in a body which has been energized to product characteristic magnetic fields adjacent to irregularities in the body, comprising a main pick-up responsive to magnetic fields caused by two conditions of said body, an auxiliary pick-up concurrently responsive primarily to magnetic fields in the same longitudinal portion of the body caused by one of said conditions, an auxiliary pick-up responsive primarily to magnetic fields in the same longitudinal portion of the body caused by the other of said two conditions, a main amplifying means associated with said main pick-up, a recording means associated with said main amplifying means, contact means effective upon actuation to prevent the operation of said recording means by said main amplifying means, a second amplifying means to actuate said contact means in response to one of said auxiliary pick-ups, contact means effective when actuated to restore the operability of said recording means in response to the main amplifying means if such ability to respond has been nullified by the first-named contact means, and a third amplifying means to actuate said last-mentioned contact means in response to the other of said auxiliary pick-ups.

WALTER C. BARNES.
HENRY W. KEEVIL.

REFERENCES CITED

The following references are of record in the file of this patent:

UNITED STATES PATENTS

| Number | Name | Date |
| --- | --- | --- |
| 1,946,196 | Drake et al. | Feb. 6, 1934 |
| 1,955,953 | Drake | Apr. 24, 1934 |
| 1,967,812 | Drake | July 24, 1934 |
| 2,027,814 | De Lanty | Jan. 14, 1936 |
| 2,031,469 | Drake | Feb. 18, 1936 |
| 2,036,856 | Drake | Apr. 7, 1936 |
| 2,125,983 | Bettison et al. | Aug. 9, 1938 |
| 2,152,540 | Drake | Mar. 28, 1939 |
| 2,223,371 | Keevil | Dec. 3, 1940 |
| 2,317,719 | Barnes | Apr. 27, 1943 |
| 2,322,452 | Jones | June 22, 1943 |

Certificate of Correction

Patent No. 2,472,784.

June 14, 1949.

WALTER C. BARNES ET AL.

It is hereby certified that errors appear in the printed specification of the above numbered patent requiring correction as follows:

Column 15, line 63, claim 8, for the word "angle" read *angles*; line 66, same claim, for "rails" read *rail*; column 19, line 23, claim 23, for "product" read *produce*; and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*